(12) United States Patent
Yutani

(10) Patent No.: US 11,137,662 B2
(45) Date of Patent: Oct. 5, 2021

(54) PLUGGABLE OPTICAL MODULE AND OPTICAL COMMUNICATION SYSTEM

(71) Applicant: NEC Corporation, Tokyo (JP)

(72) Inventor: Katsuhiro Yutani, Tokyo (JP)

(73) Assignee: NEC CORPORATION, Tokyo (JP)

(*) Notice: Subject to any disclaimer, the term of this patent is extended or adjusted under 35 U.S.C. 154(b) by 0 days.

(21) Appl. No.: 16/467,137

(22) PCT Filed: Aug. 1, 2017

(86) PCT No.: PCT/JP2017/027807
§ 371 (c)(1),
(2) Date: Jun. 6, 2019

(87) PCT Pub. No.: WO2018/116516
PCT Pub. Date: Jun. 28, 2018

(65) Prior Publication Data
US 2020/0073196 A1    Mar. 5, 2020

(30) Foreign Application Priority Data

Dec. 19, 2016    (JP) .............................. JP2016-245410

(51) Int. Cl.
*G02F 1/00*    (2006.01)
*G02B 6/42*    (2006.01)
(Continued)

(52) U.S. Cl.
CPC ......... *G02F 1/2255* (2013.01); *G02B 6/4246* (2013.01); *G02F 1/0121* (2013.01);
(Continued)

(58) Field of Classification Search
CPC .... G02F 1/01708; G02F 1/0121; G02F 1/017; H03H 7/38
(Continued)

(56) References Cited

U.S. PATENT DOCUMENTS 9,337,934 B1 * 5/2016 Agazzi .................. H04L 7/0075
10,211,917 B1 * 2/2019 Wang ................... H04B 10/541
(Continued)

FOREIGN PATENT DOCUMENTS

CN    102648434 A    8/2012
JP    2004-266760 A   9/2004
(Continued)

OTHER PUBLICATIONS

International Search Report for PCT Application No. PCT/JP2017/027807, dated Oct. 24, 2017.
(Continued)

*Primary Examiner* — Kaveh C Kianni
(74) *Attorney, Agent, or Firm* — Sughrue Mion, PLLC

(57) ABSTRACT

A drive unit outputs a modulation signal based on a data signal input from an optical communication apparatus through a pluggable electric connector. An optical modulator outputs an optical signal generated by modulating a light output from a light source based on the modulation signal. A control unit controls a modulation operation of the optical modulator. The control unit outputs a driver signal instructing to start a setting operation to the optical communication apparatus. The optical communication apparatus monitors the modulation operation of the optical modulator in response to the driver signal and performs an operation of correcting the data signal and/or an operation of outputting a control signal representing a control setting for the modulation operation to the control unit based on a monitoring result. The control unit controls the modulation operation of the optical modulator based on the control signal when receiving the control signal.

10 Claims, 5 Drawing Sheets

(51) Int. Cl.
  *H04B 10/61* (2013.01)
  *G02F 1/225* (2006.01)
  *G02F 1/01* (2006.01)
  *H04B 10/43* (2013.01)
  *H04L 7/00* (2006.01)
  *G02F 1/21* (2006.01)

(52) U.S. Cl.
  CPC ......... *H04B 10/43* (2013.01); *H04B 10/6164* (2013.01); *H04L 7/0075* (2013.01); *G02F 1/212* (2021.01)

(58) Field of Classification Search
  USPC .......................................................... 385/3
  See application file for complete search history.

(56) References Cited

U.S. PATENT DOCUMENTS

| | | | | |
|---|---|---|---|---|
| 2003/0020986 | A1* | 1/2003 | Pang | G02B 6/4246 398/139 |
| 2003/0218549 | A1* | 11/2003 | Logvinov | H04B 3/542 340/870.07 |
| 2003/0223756 | A1* | 12/2003 | Tatum | H04B 10/40 398/135 |
| 2005/0169585 | A1 | 8/2005 | Aronson et al. | |
| 2008/0267620 | A1* | 10/2008 | Cole | H04B 10/0775 398/17 |
| 2009/0016685 | A1 | 1/2009 | Hudgins et al. | |
| 2009/0154930 | A1* | 6/2009 | Hinderthuer | H04Q 11/0071 398/83 |
| 2011/0211798 | A1* | 9/2011 | Chen | G02B 6/4448 385/135 |
| 2011/0268452 | A1* | 11/2011 | Beamon | H04B 10/25758 398/117 |
| 2016/0028491 | A1 | 1/2016 | Oe | |
| 2017/0012709 | A1 | 1/2017 | Duthel | |
| 2018/0019812 | A1* | 1/2018 | Fludger | H04B 10/0795 |
| 2018/0019814 | A1* | 1/2018 | Fludger | H04B 10/0799 |

FOREIGN PATENT DOCUMENTS

| | | |
|---|---|---|
| JP | 2008-533822 A | 8/2008 |
| JP | 2015-119437 A | 6/2015 |
| JP | 2016-025497 A | 2/2016 |
| JP | 2016-171363 A | 9/2016 |
| WO | 2016/139886 A1 | 9/2016 |

OTHER PUBLICATIONS

Japanese Office Action for JP Application No. 2020-067513 dated Mar. 9, 2021 with English Translation.

Ian et al.,"Implementation Agreement for CFP2-Analogue Coherent Optics Module, IA # OIF-CFP2-ACO-01.0". Optical Internetworking Forum, pp. 1-92, Jan. 22, 2016.

Chinese Office Action for CN Application No. 201780078254.7 dated May 25, 2021 with English Translation.

* cited by examiner

PLUGGABLE OPTICAL MODULE AND OPTICAL COMMUNICATION SYSTEM

This application is a National Stage Entry of PCT/JP2017/027807 filed on Aug. 1, 2017, which claims priority from Japanese Patent Application 2016-245410 filed on Dec. 19, 2016, the contents of all of which are incorporated herein by reference, in their entirety.

TECHNICAL FIELD

The present invention relates to a pluggable optical module and an optical communication system.

BACKGROUND ART

In data communication using an optical communication system, an increase in an amount of data transmitted through an optical transmission path is further developed. One of the techniques that can realize this is a technique of increasing frequency utilization efficiency of wavelength multiplexing transmission by multi-level modulation.

Recently, digital coherent communication has been introduced in multilevel modulation optical transmission systems. While low-end and low-cost of an apparatus for the digital coherent communication have been developed, introduction of optical communication systems in which optical transceivers are configured as pluggable optical modules is in progress (Patent Literature 1).

In the digital coherent communication, a digital signal processing device performing modulation processing and demodulation processing and a digital coherent pluggable optical module (an optical transceiver) are used as key devices. The digital signal processing device preforms transmission signal processing, and communicates high speed analog signals with the digital coherent pluggable optical module. The digital coherent pluggable optical module has a function for converting an optical signal into an electric signal or converting the electric signal into the optical signal. In this configuration, the digital signal processing device is implemented in an optical communication apparatus which the digital coherent pluggable optical module is insertable into and removable from.

CITATION LIST

Patent Literature

[Patent Literature 1] Japanese Unexamined Patent Application Publication No. 2016-25497

SUMMARY OF INVENTION

Technical Problem

In the digital coherent communication, it is required that the optical communication apparatus optimizes parameters set to the optical transceiver and the optical communication apparatus and they are connected each other so as to realize desired transmission characteristics by preventing the electric signal communicated between the digital signal processing device and the optical transceiver and the optical signal output from the optical transceiver from deteriorating.

In general, due to the compatibility between the digital signal processing device and the pluggable optical module and individual differences of the digital signal processing device and the pluggable optical module, it is necessary to perform a setting operation of the digital signal processing device and the pluggable optical module before starting the operation of the optical communication system.

For example, in a configuration not using the pluggable optical module in which optical components such as the digital signal processing device and the optical transceiver are implemented in the same optical communication apparatus, the parameter optimization and the setting process described above can be performed by appropriately managing the design of the optical communication apparatus.

However, as described above, in the system in which the optical transceiver is configured as the pluggable optical module, the parameter optimization and the setting process of the pluggable optical module need to be performed separately from those of the optical communication apparatus. Further, from the viewpoint of operation cost reduction and multi-vender adoption, there is an increasing trend to build systems by procuring the digital signal processing device and the pluggable optical module from the multiple vendors. Thus, it is difficult for many device venders and system users to match the digital signal processing device and the pluggable optical module.

The present invention has been made in view of the aforementioned circumstances and aims to ensure compatibility between a pluggable optical module and an optical communication apparatus with a simple configuration.

Solution to Problem

An aspect of the present invention is a pluggable optical module including: a pluggable electric connector configured to be insertable into or removable from an optical communication apparatus, the pluggable electric connector being capable of bi-directionally communicating with the optical communication apparatus; a drive unit configured to output a modulation signal based on a data signal input from the optical communication apparatus through the pluggable electric connector; a light source; an optical modulator configured to output an optical signal generated by modulating a light output from the light source based on the modulation signal; and a control unit configured to control a modulation operation of the optical modulator, in which the control unit outputs a driver signal instructing to start a setting operation to the optical communication apparatus through the pluggable electric connector, the optical communication apparatus: monitors the modulation operation of the optical modulator in response to the driver signal; and performs one or both of an operation of correcting the data signal and an operation of outputting a control signal representing a control setting for the modulation operation to the control unit based on a monitoring result, and the control unit controls the modulation operation of the optical modulator based on the control signal when receiving the control signal.

An aspect of the present invention is an optical communication system including: an optical communication apparatus; and a pluggable optical module configured to be insertable into and removable from the optical communication apparatus, in which the pluggable optical module includes: a pluggable electric connector configured to be insertable into or removable from the optical communication apparatus, the pluggable electric connector being capable of bi-directionally communicating with the optical communication apparatus; a drive unit configured to output a modulation signal based on a data signal input from the optical communication apparatus through the pluggable electric connector; a light source; an optical modulator configured to output an optical signal generated by modulating a light output from the light source based on the modulation signal; and a control unit configured to control a modulation operation of the optical modulator, the control unit outputs a driver signal instructing to start a setting operation to the optical communication apparatus through the pluggable electric connector, the optical communication apparatus: monitors the modulation operation of the optical modulator in response to the driver signal; and performs one or both of an operation of correcting the data signal and an operation of outputting a control signal representing a control setting for the modulation operation to the control unit based on a monitoring result, and the control unit controls the modulation operation of the optical modulator based on the control signal when receiving the control signal.

Advantageous Effects of Invention

According to the present invention, in a pluggable optical module, it is possible to output an optical signal accurately corresponding to a data signal regardless of a modulation scheme.

DESCRIPTION OF EMBODIMENTS

Figure 1:
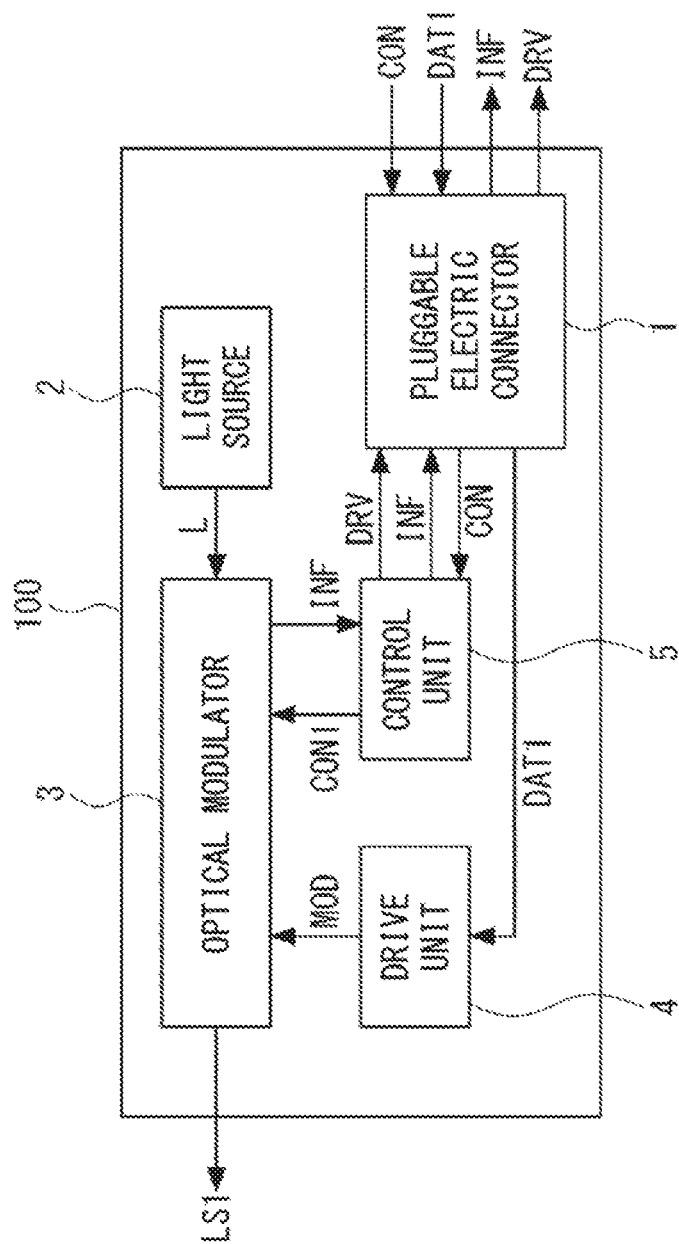
FIG. 1 is a block diagram schematically illustrating a configuration of a pluggable optical module 100 according to a first example embodiment.

Example embodiments of the present invention will be described below with reference to the drawings. The same components are denoted by the same reference numerals throughout the drawings, and a repeated explanation is omitted as needed.

First Example Embodiment

Figure 2:
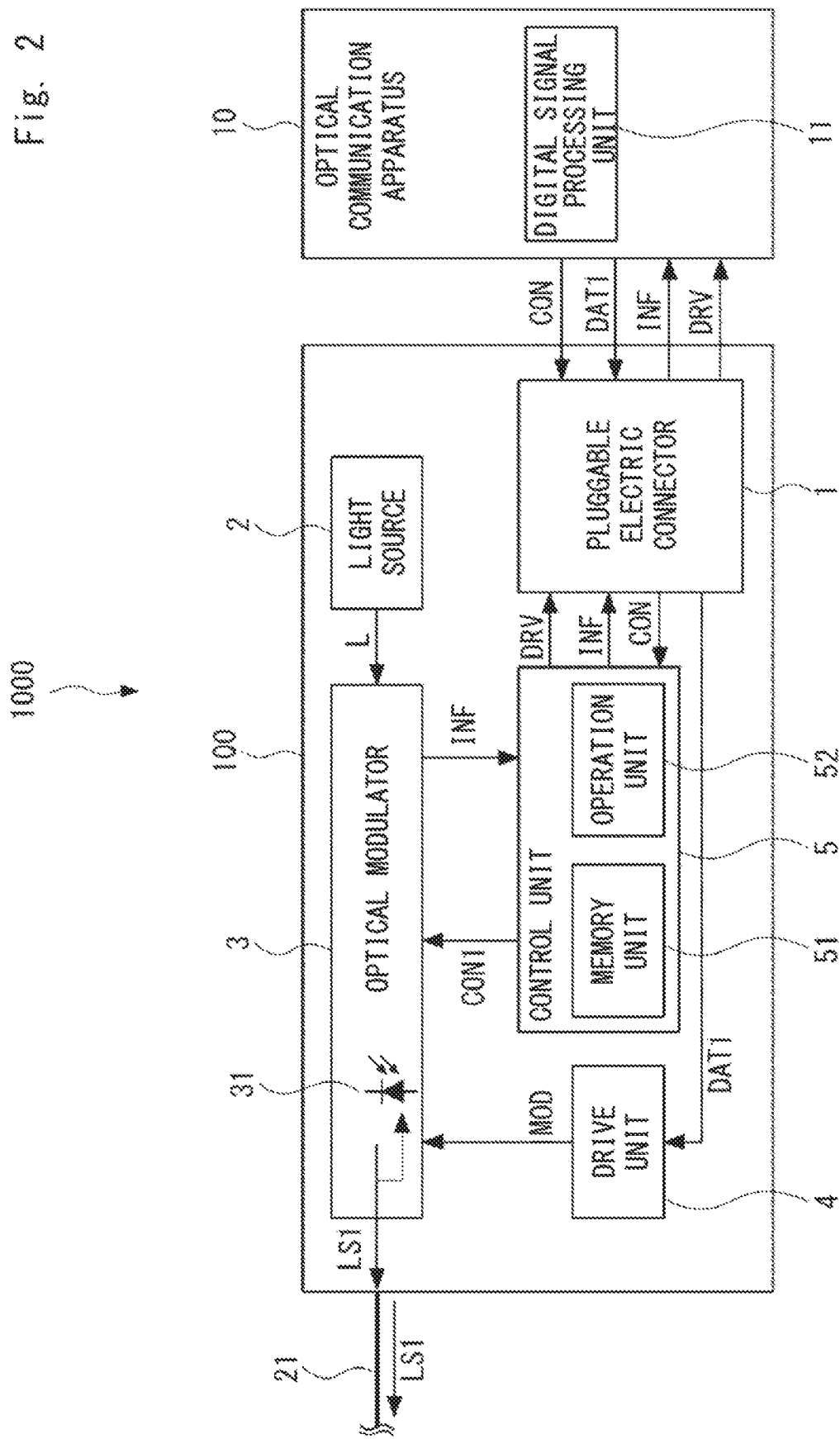
FIG. 2 is a block diagram illustrating a configuration example of a main part of an optical communication system 1000 in which the pluggable optical module 100 according to the first example embodiment is implemented.

A pluggable optical module 100 according to the first example embodiment will be described. In the present example embodiment, the pluggable optical module 100 may be configured, for example, as a digital coherent optical transceiver. FIG. 1 is a block diagram schematically illustrating a configuration of the pluggable optical module 100 according to the first example embodiment. FIG. 2 is a block diagram illustrating a configuration example of a main part of an optical communication system 1000 in which the pluggable optical module 100 according to the first example embodiment is implemented.

In the present example embodiment, as illustrated in FIG. 2, the pluggable optical module 100 is configured, for example, in such a manner that a connector of an optical fiber with connector 21 is insertable into and removable from the pluggable optical module 100. For example, a FC connector and MU connector can be used as the connector of the optical fiber with connector 21.

The pluggable optical module 100 is configured to be capable of transmitting an optical signal LS1 modulated based on a digital signal DAT1 that is a data signal input from an optical communication apparatus 10 serving as a communication host to other pluggable optical modules such as coherent optical transceivers. The pluggable optical module 100 can be also configured to be capable of controlling a modulation operation of an optical signal and operation setting based on a control signal CON input from the optical communication apparatus 10 serving as the communication host.

The optical communication apparatus 10 performs communication signal processing such as flaming processing of a communication data signal from the pluggable optical module 100 or a communication data signal input to the pluggable optical module 100, for example, with a digital signal processing unit 11 configured as an IC (Integrated Circuit).

The configuration of the pluggable optical module 100 will be specifically described with reference to FIG. 1. The pluggable optical module 100 includes a pluggable electric connector 1, a light source 2, an optical modulator 3, a drive unit 4, and a control unit 5.

The pluggable electric connector 1 is configured to be insertable into and removable from the optical communication apparatus 10. The pluggable electric connector 1 is configured to be capable of receiving the control signal CON and the digital signal DAT1 that is the data signal output from the optical communication apparatus 10, and transferring the signals to each component of the pluggable optical module 100. The pluggable electric connector 1 is also configured to be capable of transferring a driver signal DRV and an operation signal INF output from the control unit 5 to the optical communication apparatus 10. In other words, the pluggable electric connector 1 is configured to allow bi-directional communication between the pluggable optical module 100 and optical communication apparatus 10.

The light source 2 outputs a light L to the optical modulator 3. For example, a semiconductor laser device or a wavelength-tunable optical module including a semiconductor optical device and a ring oscillator may be used as the light source 2. The light source 2 is configured, for example, to be capable of outputting a CW (Continuous Wave) light.

The optical modulator 3 is, for example, a Mach-Zehnder type optical modulator. The optical modulator 3 outputs the optical signal LS1 generated by modulating the light L by a predetermined modulation scheme in response to a modulation signal MOD output from the drive unit 4 to the optical fiber 21. The optical modulator 3 may modulate the optical signal LS1 by various modulation schemes such as phase modulation, amplitude modulation, and polarization modulation, or by combining the various modulation schemes.

The drive unit 4 receives the digital signal DAT1 that is the data signal through the pluggable electric connector 1, and outputs the modulation signal MOD generated by, for example, amplifying the digital signal DAT1 to the optical modulator 3. The drive unit 4 may generate the modulation signal MOD, for example, by amplifying the digital signal DAT1 to a level required by the optical modulator 3.

The control unit 5 controls the modulation operation of the optical modulator 3 with a control signal CON1 generated based on the control signal CON input through the pluggable electric connector 1. For example, when the optical modulator 3 is the Mach-Zehnder type optical modulator that applies the driver signal to phase modulation areas signal disposed on waveguides to perform the modulation operation, the control unit 5 can control a bias point of the optical modulator 3 by setting the optical modulator 3 in such a manner that a predetermined bias voltage is applied to the phase modulation areas. The control unit 5 is also configured to be capable of controlling optical power of the optical signal LS1.

Here, the phase modulation area will be described. The phase modulation area is an area that includes an electrode formed on the optical waveguide. An effective refractive index of the optical waveguide below the electrode is changed by applying an electric signal, for example, a voltage signal, to the electrode. As a result, a substantial optical length of the optical waveguide in the phase modulation area can be changed. Thus, the phase modulation area can change a phase of the optical signal propagating through the optical waveguide. Then, the optical signal can be modulated by providing a phase difference between the optical signals propagating through two optical waveguides.

The control unit 5 also outputs the driver signal DRV that instructs the optical communication apparatus 10 to start a predetermined setting operation to the optical communication apparatus 10 through the pluggable electric connector 1. The detail of the setting operation will be described below.

Further, the control unit 5 may receive the operation signal INF that is output from the optical modulator 3 and indicates the modulation operation of the optical modulator 3, and transfer the received operation signal INF to the optical communication apparatus 10 through the pluggable electric connector 1. In this case, the control unit 5 may receive the operation signal INF that indicates the modulation operation of the optical modulator 3, convert the operation signal INF into the signal suitable for signal processing in the optical communication apparatus 10, and output the converted operation signal INF. The optical communication apparatus 10 can monitor the modulation operation of the optical modulator 3 by referring to the operation signal INF.

For example, as illustrated in FIG. 2, the operation signal INF may be generated by converting a part of the optical signal LS1 from the optical signal to the electric signal with a photodiode 31 disposed in the optical modulator 3. In this case, the optical communication apparatus 10 can monitor signal quality of the optical signal LS1 output from the pluggable optical module 100 by referring to the operation signal INF.

Here, a configuration of the control unit 5 will be described. The control unit 5 includes, for example, a memory unit 51 and an operation unit 52. The memory unit 51 is configured to be capable of storing the driver signal DRV, the operation signal INF output from the optical modulator 3, and the signal CON supplied from the optical communication apparatus 10. The operation unit 52 is configured to perform operational processing necessary for controlling the operation of the optical modulator 3 based on the information stored in the memory unit 51. The operation unit 52 generates, for example, the control signal CON1 that instructs the optical modulator 3 of a value of the bias voltage applied to the phase modulation area.

Figure 3:
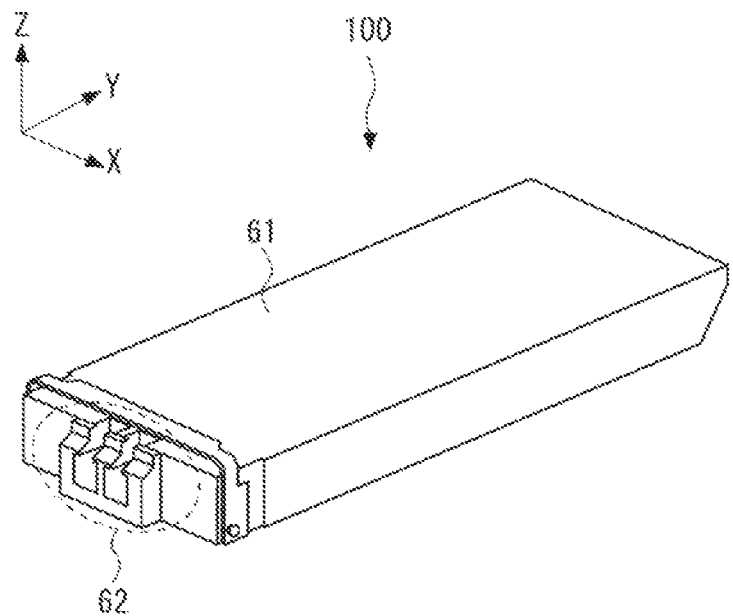
FIG. 3 is a perspective view of the pluggable optical module 100 according to the first example embodiment when observed from a side of the optical fiber 21.
Figure 4:
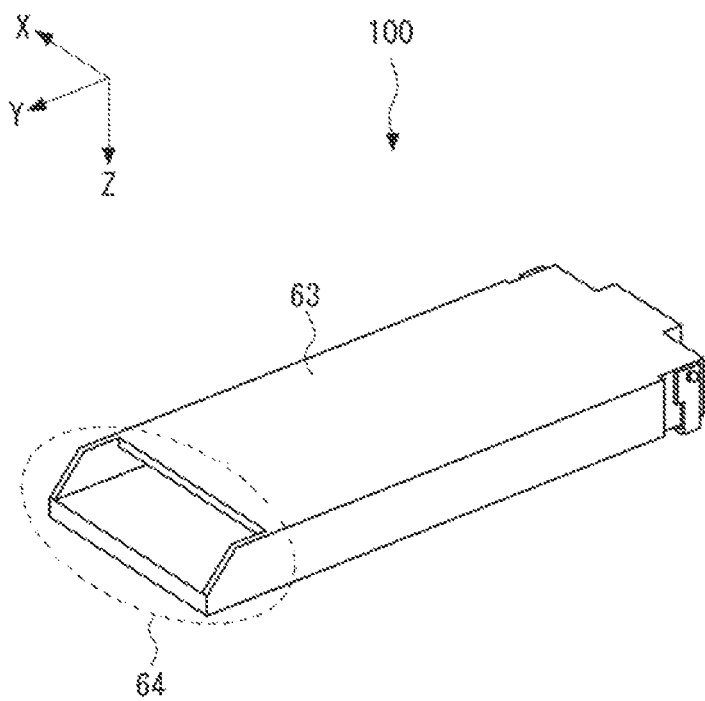
FIG. 4 is a perspective view of the pluggable optical module 100 according to the first example embodiment when observed from a side of an optical communication apparatus 10.

Next, an appearance of the pluggable optical module 100 will be described. FIG. 3 is a perspective view of the pluggable optical module 100 according to the first example embodiment when observed from a side of the optical fiber 21. A numerical sign 61 shown in FIG. 3 indicates an upper surface of the pluggable optical module 100. A numerical sign 62 shown in FIG. 3 indicates an insertion port into which the connector of the optical fiber 21 enters. FIG. 4 is a perspective view of the pluggable optical module 100 according to the first example embodiment when observed from a side of the optical communication apparatus 10. A numerical sign 63 shown in FIG. 4 indicates a lower surface of the pluggable optical module 100. A numerical sign 64 shown in FIG. 4 indicates a connection part of the pluggable electric connector 1 to which the optical communication apparatus 10 is connected.

Figure 5:
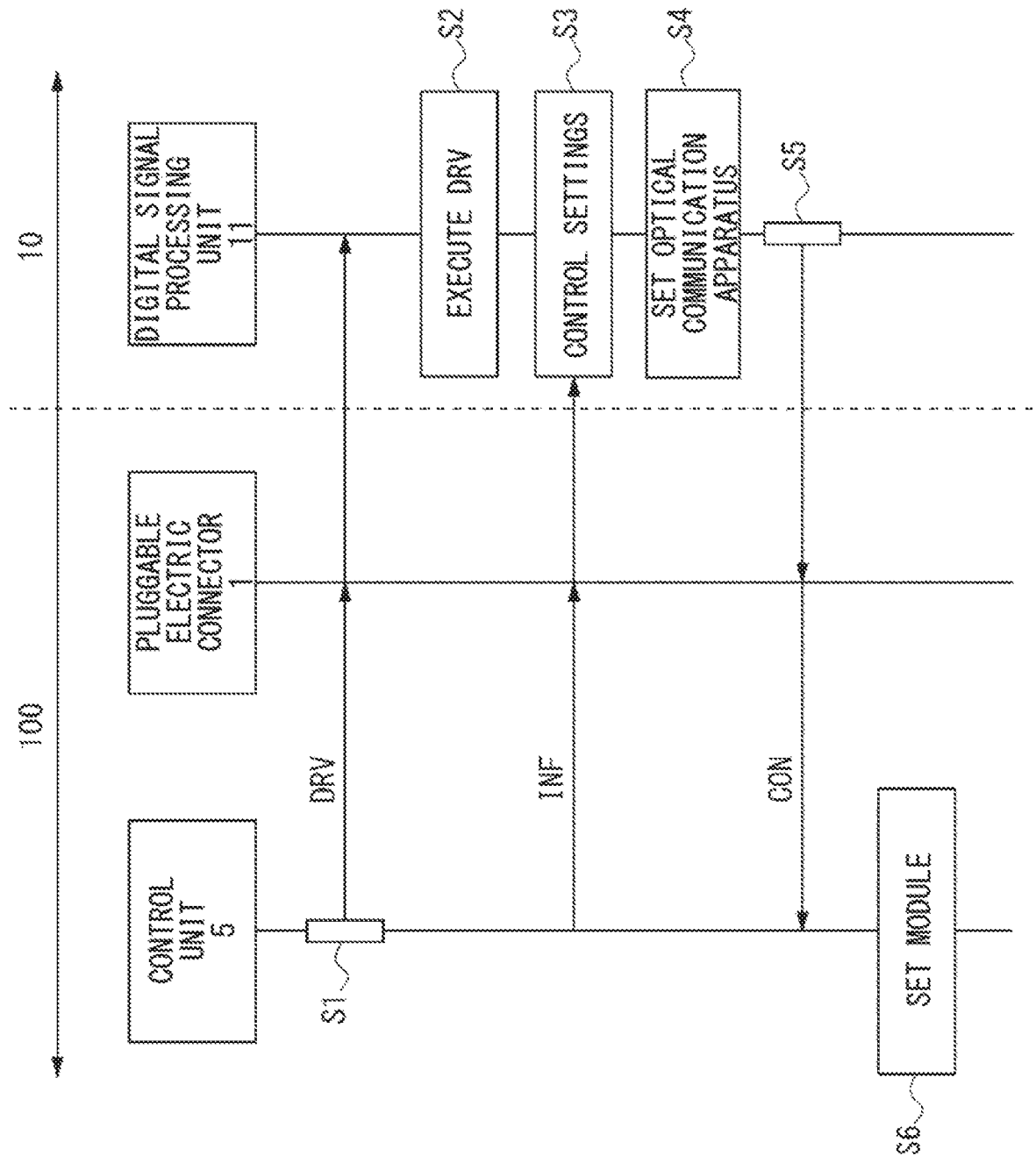
FIG. 5 is a sequence diagram illustrating an initial setting operation between the pluggable optical module 100 and the optical communication apparatus 10.

Next, setting operations of the pluggable optical module 100 and the optical communication apparatus 10 in the optical communication system 1000 will be described. FIG. 5 is a sequence diagram illustrating an initial setting operation between the pluggable optical module 100 and the optical communication apparatus 10. An example in which the setting operation is performed as an initial setting when inserting the pluggable optical module 100 into the optical communication apparatus 10 for the first time will be described below.

Step S1

The digital signal processing unit 11 disposed in the optical communication apparatus 10 downloads the driver signal DRV from the control unit 5 in the pluggable optical module 100. The download process may be performed as a plug and play operation that is started when the digital signal processing unit 11 automatically detects the insertion of the pluggable optical module 100. The download process may be also started when those who build the optical communication system 1000 (e.g., an apparatus vender or a user) provides the digital signal processing unit 11 with an instruction.

Step S2

The digital signal processing unit 11 performs the operation specified by the read driver signal DRV.

Step S3

By performing the operation specified by the read driver signal DRV, the digital signal processing unit 11 monitors a condition of the pluggable optical module 100, and determines a control setting for performing a correction operation of the digital signal DAT1 provided to the pluggable optical module 100 and an appropriate control setting to be set to the pluggable optical module 100 based on a monitoring result.

Step S4

The digital signal processing unit 11 sets the determined control setting to the optical communication apparatus 10. Specifically, the digital signal processing unit 11 can perform the correction operation of the digital signal DAT1 provided to the pluggable optical module 100 so as to cause the optical signal LS1 output from the pluggable optical module 100 to have the desired signal quality.

Step S5

After that, the digital signal processing unit 11 outputs the control signal CON including the determined control setting to the pluggable optical module 100.

Step S6

The control unit 5 receives the control signal CON including the setting information through the pluggable electric connector 1. The control unit 5 performs a setting operation of the optical modulator 3 by outputting the control signal CON1 reflecting parameter setting or the like based on the setting information. Specifically, the control unit 5 can adjust the bias voltage applied to the phase modulation areas of the optical modulator 3 configured as the Mach-Zehnder type optical modulator by providing the optical modulator 3 with the control signal CON1. Accordingly, it is possible to cause the optical signal LS1 to have the desired signal quality.

Therefore, by optimizing a connecting condition between the optical communication apparatus 10 and the pluggable optical module 100, it is possible to maximize the signal quality of the optical signal and to ensure the consistency between the optical communication apparatus 10 and the pluggable optical module 100.

Note that both or only one of the setting process of the optical communication apparatus 10 in Step S4 and the setting process of the pluggable optical module 100 in Step S6 in the above description may be performed as appropriate.

As described above, according to the present configuration, by providing the optical communication apparatus 10 from the pluggable optical module 100 with the driver signal according to the modulation scheme and the operation of the pluggable optical module 100 for deriving the control settings to be set to the pluggable optical module 100 and the optical communication apparatus 10, the transmission signal characteristics can be desired quality without providing the pluggable optical module 100 and the optical communication apparatus 10 with other data or instruction.

Since the determination and setting of the control settings are automatically performed by performing the operation specified by the driver signal, excellent signal characteristics can be realized without spending time on signal calibration setting and prior adjustment, and network operation can be started. Therefore, it is possible to preferably reduce the operation cost of the optical communication system.

After the operations of the optical communication apparatus and the optical communication system have been started, since it is possible to switch the modulation scheme and compensate the effect of temporal change such as long-term variation of circumstance factor or the like by performing the setting operations of the pluggable optical module 100 and the optical communication apparatus 10 as appropriate, the long-term reliability of the optical communication system can be also improved.

Further, when a register is defined as an interface between the host (the optical communication apparatus) and the optical transceiver (the pluggable optical module), the setting may be performed by executing the driver in order to match a standard of a resolution and a variation amount specified by the register. In this case, since efficient and labor-saving design of the host and the optical transceiver can be achieved, shortening of product development time can be achieved.

Other Example Embodiments

Figure 6:
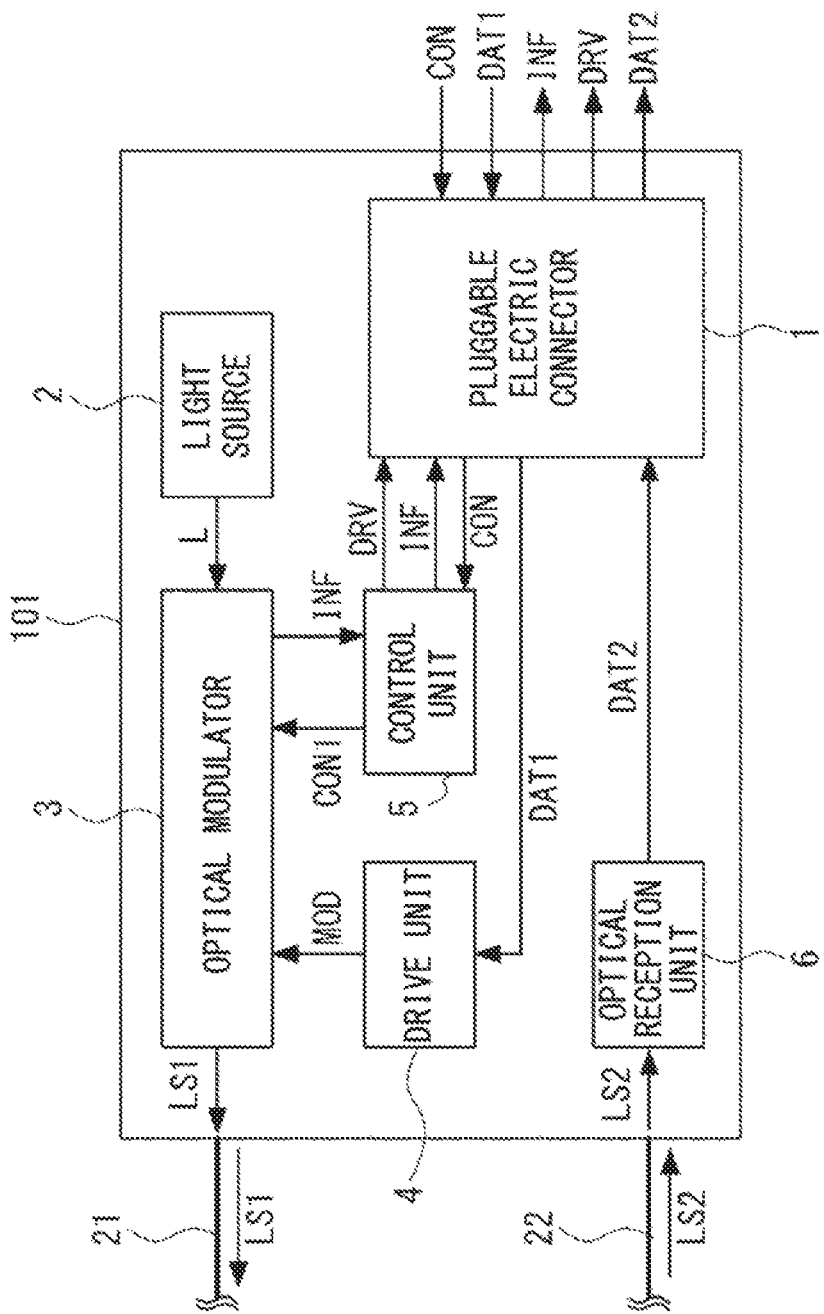
FIG. 6 is a diagram illustrates a modified example of the pluggable optical module according to the first example embodiment.

The present invention is not limited to the above-described exemplary embodiments, and can be modified as appropriate without departing from the scope of the invention. For example, it has been described that the pluggable optical module 100 has a function for outputting the optical signal LS1 in the above description, and however, the pluggable optical module may have a function for receiving an optical signal input from the outside. FIG. 6 is a diagram illustrates a modified example of the pluggable optical module according to the first example embodiment. The pluggable optical module 101 in FIG. 6 has a configuration in which an optical reception unit 6 is added to the pluggable optical module 100.

The optical reception unit 6 is configured in such a manner that a connector of an optical fiber with connector 22 is insertable into and removable from optical reception unit 6. As in the case of the connector of the optical fiber 21, a FC connector and MU connector can be used as the connector of the optical fiber with connector 22.

The optical reception unit 6 converts an optical signal LS2 input through the optical fiber 22 into a digital signal DAT2 that is a multi-channel electric signal. Then, the optical reception unit 6 outputs the digital signal DAT2 to the optical communication apparatus 10 through the pluggable electric connector 1. The optical communication apparatus 10 can obtain necessary information by processing the digital signal DAT2 with the digital signal processing unit 11.

In the example embodiments described above, an example in which the digital signal processing unit 11 is configured as the IC, and, however, the digital signal processing unit 11 may be configured as a DSP (Digital Signal Processor), for example, in CFP2-ACO (Analog Coherent Optics) or the like.

In the drawings referred in the example embodiments described above, the transmission of the signal between the component elements disposed in the pluggable optical module and the component elements disposed in the optical communication system has been represented by using the arrow line, and however, this representation does not mean that the signal transmits in a single direction between two component elements. It should be appreciated that the signal can be bi-directionally exchanged.

While the present invention has been described above with reference to exemplary embodiments, the present invention is not limited to the exemplary embodiments stated above.

(Supplementary Note 1) A pluggable optical module including: a pluggable electric connector configured to be insertable into or removable from an optical communication apparatus, the pluggable electric connector being capable of bi-directionally communicating with the optical communication apparatus; a drive unit configured to output a modulation signal based on a data signal input from the optical communication apparatus through the pluggable electric connector; a light source; an optical modulator configured to output an optical signal generated by modulating a light output from the light source based on the modulation signal; and a control unit configured to control a modulation operation of the optical modulator, in which the control unit outputs a driver signal instructing to start a setting operation to the optical communication apparatus through the pluggable electric connector, the optical communication apparatus: monitors the modulation operation of the optical modulator in response to the driver signal; and performs one or both of an operation of correcting the data signal and an operation of outputting a control signal representing a control setting for the modulation operation to the control unit based on a monitoring result, and the control unit controls the modulation operation of the optical modulator based on the control signal when receiving the control signal.

(Supplementary Note 2) The pluggable optical module according to Supplementary Note 1, in which the control unit receives operation information indicating a condition of the modulation operation from the optical modulator and outputs an operation signal based on the operation information to the optical communication apparatus through the pluggable electric connector, and the optical communication apparatus monitors the condition of the modulation operation based on the operation signal.

(Supplementary Note 3) The pluggable optical module according to Supplementary Note 2, in which the optical modulator outputs a signal generated by converting a part of the optical signal into an electric signal to the control unit as the operation information.

(Supplementary Note 4) The pluggable optical module according to any one of Supplementary Notes 1 to 3, in which the optical modulator is configured as a Mach-Zehnder type optical modulator in which a phase modulation area is disposed on an optical waveguide, and the control unit is configured to be capable of controlling a bias voltage provided to the phase modulation area based on the control signal.

(Supplementary Note 5) The pluggable optical module according to any one of Supplementary Notes 1 to 4, in which when the pluggable electric connector is inserted into the optical communication apparatus, the control unit outputs the driver signal, and the optical communication apparatus monitors the modulation operation of the optical modulator in response to the driver signal, and performs one or both of the operation of correcting the data signal and the operation of outputting the control signal to the control unit based on the monitoring result.

(Supplementary Note 6) An optical communication system including: an optical communication apparatus; and a pluggable optical module configured to be insertable into and removable from the optical communication apparatus, in which the pluggable optical module includes: a pluggable electric connector configured to be insertable into or removable from the optical communication apparatus, the pluggable electric connector being capable of bi-directionally communicating with the optical communication apparatus; a drive unit configured to output a modulation signal based on a data signal input from the optical communication apparatus through the pluggable electric connector; a light source; an optical modulator configured to output an optical signal generated by modulating a light output from the light source based on the modulation signal; and a control unit configured to control a modulation operation of the optical modulator, in which the control unit outputs a driver signal instructing to start a setting operation to the optical communication apparatus through the pluggable electric connector; the optical communication apparatus, monitors the modulation operation of the optical modulator in response to the driver signal; and performs one or both of an operation of correcting the data signal and an operation of outputting a control signal representing a control setting for the modulation operation to the control unit based on a monitoring result, and the control unit controls the modulation operation of the optical modulator based on the control signal when receiving the control signal.

(Supplementary Note 7) The optical communication system according to Supplementary Note 6, in which the control unit receives operation information indicating a condition of the modulation operation from the optical modulator and outputs an operation signal based on the operation information to the optical communication apparatus through the pluggable electric connector, and the optical communication apparatus monitors the condition of the modulation operation based on the operation signal.

(Supplementary Note 8) The optical communication system according to Supplementary Note 7, in which the optical modulator outputs a signal generated by converting a part of the optical signal into an electric signal to the control unit as the operation information.

(Supplementary Note 9) The optical communication system according any one of Supplementary Notes 6 to 8, in which the optical modulator is configured as a Mach-Zehnder type optical modulator in which a phase modulation area is disposed on an optical waveguide, and the control unit is configured to be capable of controlling a bias voltage provided to the phase modulation area based on the control signal.

(Supplementary Note 10) The optical communication system according any one of Supplementary Notes 6 to 9, in which when the pluggable electric connector is inserted into the optical communication apparatus, the control unit outputs the driver signal, and the optical communication apparatus monitors the modulation operation of the optical modulator in response to the driver signal, and performs one or both of the operation of correcting the data signal and the operation of outputting the control signal to the control unit based on the monitoring result.

(Supplementary Note 11) A method for setting an optical communication system, the optical communication system including: an optical communication apparatus; and a pluggable optical module configured to be insertable into and removable from the optical communication apparatus, the pluggable optical module including: a pluggable electric connector configured to be insertable into or removable from the optical communication apparatus, the pluggable electric connector being capable of bi-directionally communicating with the optical communication apparatus; a drive unit configured to output a modulation signal based on a data signal input from the optical communication apparatus through the pluggable electric connector; a light source; an optical modulator configured to output an optical signal generated by modulating a light output from the light source based on the modulation signal; and a control unit configured to control a modulation operation of the optical modulator, the method including: causing the control unit to output a driver signal instructing to start a setting operation to the optical communication apparatus through the pluggable electric connector; causing the optical communication apparatus: to monitor the modulation operation of the optical modulator in response to the driver signal and to perform one or both of an operation of correcting the data signal and an operation of outputting a control signal representing a control setting for the modulation operation to the control unit based on a monitoring result, and; causing the control unit to control the modulation operation of the optical modulator based on the control signal when receiving the control signal.

(Supplementary Note 12) The method for setting the optical communication system according to Supplementary Note 11, in which the optical modulator outputs operation information indicating a condition of the modulation operation to the control unit, the control unit outputs an operation signal based on the operation information to the optical communication apparatus through the pluggable electric connector, and the optical communication apparatus monitors the condition of the modulation operation based on the operation signal.

(Supplementary Note 13) The method for setting the optical communication system according to Supplementary Note 12, in which the optical modulator outputs a signal generated by converting a part of the optical signal into an electric signal to the control unit as the operation information.

(Supplementary Note 14) The method for setting the optical communication system according to any one of Supplementary Notes 11 to 13, in which the optical modulator is configured as a Mach-Zehnder type optical modulator in which a phase modulation area is disposed on an optical waveguide, and the control unit is configured to be capable of controlling a bias voltage provided to the phase modulation area based on the control signal.

(Supplementary Note 15) The method for setting the optical communication system according to any one of Supplementary Notes 11 to 13, when the pluggable electric connector is inserted into the optical communication apparatus, the control unit outputs the driver signal, and the optical communication apparatus monitors the modulation operation of the optical modulator in response to the driver signal, and performs one or both of the operation of correcting the data signal and the operation of outputting the control signal to the control unit based on the monitoring result.

(Supplementary Note 16) A method for setting an pluggable optical module, the pluggable optical module including: a pluggable electric connector configured to be insertable into or removable from an optical communication apparatus, the pluggable electric connector being capable of bi-directionally communicating with the optical communication apparatus; a drive unit configured to output a modulation signal based on a data signal input from the optical communication apparatus through the pluggable electric connector; a light source; an optical modulator configured to output an optical signal generated by modulating a light output from the light source based on the modulation signal; and a control unit configured to control a modulation operation of the optical modulator, the method including: causing the control unit to output a driver signal instructing to start a setting operation to the optical communication apparatus through the pluggable electric connector; causing the optical communication apparatus: to monitor the modulation operation of the optical modulator in response to the driver signal and to perform one or both of an operation of correcting the data signal and an operation of outputting a control signal representing a control setting for the modulation operation to the control unit based on a monitoring result, and; causing the control unit to control the modulation operation of the optical modulator based on the control signal when receiving the control signal.

(Supplementary Note 17) The method for setting the pluggable optical module according to Supplementary Note 16, in which the optical modulator outputs operation information indicating a condition of the modulation operation to the control unit, the control unit outputs an operation signal based on the operation information to the optical communication apparatus through the pluggable electric connector, and the optical communication apparatus monitors the condition of the modulation operation based on the operation signal.

(Supplementary Note 18) The method for setting the pluggable optical module according to Supplementary Note 17, in which the optical modulator outputs a signal generated by converting a part of the optical signal into an electric signal to the control unit as the operation information.

(Supplementary Note 19) The method for setting the pluggable optical module according to any one of Supplementary Notes 16 to 18, in which the optical modulator is configured as a Mach-Zehnder type optical modulator in which a phase modulation area is disposed on an optical waveguide, and the control unit is configured to be capable of controlling a bias voltage provided to the phase modulation area based on the control signal.

(Supplementary Note 20) The method for setting the pluggable optical module according to any one of Supplementary Notes 16 to 18, when the pluggable electric connector is inserted into the optical communication apparatus, the control unit outputs the driver signal, and the optical communication apparatus monitors the modulation operation of the optical modulator in response to the driver signal, and performs one or both of the operation of correcting the data signal and the operation of outputting the control signal to the control unit based on the monitoring result.

The present invention has been described above with reference to the exemplary embodiments, but the present invention is not limited to the above exemplary embodiments. The configuration and details of the present invention can be modified in various ways which can be understood by those skilled in the art within the scope of the invention.

This application is based upon and claims the benefit of priority from Japanese patent application No. 2016-245410, filed on Dec. 19, 2016, the disclosure of which is incorporated herein in its entirety by reference.

REFERENCE SIGNS LIST

1 PLUGGABLE ELECTRIC CONNECTOR
2 LIGHT SOURCE
3 OPTICAL MODULATOR
4 DRIVE UNIT
5 CONTROL UNIT
6 OPTICAL RECEPTION UNIT
10 OPTICAL COMMUNICATION APPARATUS
11 DIGITAL SIGNAL PROCESSING UNIT
21, 22 OPTICAL FIBERS
31 PHOTODIODE
51 MEMORY UNIT
52 OPERATION UNIT
100, 101 PLUGGABLE OPTICAL MODULES
1000 OPTICAL COMMUNICATION SYSTEM
CON, CON1 CONTROL SIGNALS
DAT1, DAT2 DIGITAL SIGNALS
DRV DRIVER SIGNAL
L LIGHT
LS1, LS2 OPTICAL SIGNALS
MOD MODULATION SIGNAL

What is claimed is:

1. A pluggable optical module comprising:
a pluggable electric connector configured to be insertable into or removable from an optical communication apparatus, the pluggable electric connector being capable of bi-directionally communicating with the optical communication apparatus;
a drive unit configured to output a modulation signal using a data signal input from the optical communication apparatus through the pluggable electric connector;
a light source;
an optical modulator configured to output an optical signal generated by modulating a light output from the light source using the modulation signal; and
a control unit configured to control a modulation operation of the optical modulator,
wherein the control unit is configured to output a driver signal instructing to start a setting operation to the optical communication apparatus through the pluggable electric connector, wherein the control unit is configured to control a bias voltage provided to the phase modulation area based on the control signal,
wherein the optical communication apparatus is configured to:
monitor the modulation operation of the optical modulator in response to the driver signal; and
perform one or both of an operation of correcting the data signal and an operation of outputting a control signal representing a control setting for the modulation operation to the control unit using a monitoring result, and wherein the control unit is configured to control the modulation operation of the optical modulator using the control signal if receiving the control signal.

2. The pluggable optical module according to claim 1, wherein the control unit is configured to control receiving operation information indicating a condition of the modulation operation from the optical modulator, wherein the control unit is configured to output an operation signal using the operation information to the optical communication apparatus through the pluggable electric connector, and wherein the optical communication apparatus is configured to monitor the condition of the modulation operation using the operation signal.

3. The pluggable optical module according to claim 2, wherein the optical modulator is configured to output a signal generated by converting a part of the optical signal into an electric signal to the control unit as the operation information.

4. The pluggable optical module according to claim 1, wherein the optical modulator is configured as a Mach-Zehnder type optical modulator in which the phase modulation area is disposed on an optical waveguide.

5. The pluggable optical module according to claim 1, wherein the control unit is configured to, if the pluggable electric connector is inserted into the optical communication apparatus, output the driver signal, and wherein the optical communication apparatus is configured to monitor the modulation operation of the optical modulator in response to the driver signal, and performs one or both of the operation of correcting the data signal and the operation of outputting the control signal to the control unit using the monitoring result.

6. An optical communication system comprising:
an optical communication apparatus; and
a pluggable optical module configured to be insertable into and removable from the optical communication apparatus, wherein:
the pluggable optical module comprises:
a pluggable electric connector configured to be insertable into or removable from the optical communication apparatus, the pluggable electric connector being capable of bi-directionally communicating with the optical communication apparatus;
a drive unit configured to output a modulation signal using a data signal input from the optical communication apparatus through the pluggable electric connector;
a light source;
an optical modulator configured to output an optical signal generated by modulating a light output from the light source using the modulation signal; and
a control unit configured to control a modulation operation of the optical modulator, the control unit outputs a driver signal instructing to start a setting operation to the optical communication apparatus through the pluggable electric connector, wherein the control unit is configured to control a bias voltage provided to the phase modulation area based on the control signal, the optical communication apparatus:
monitors the modulation operation of the optical modulator in response to the driver signal; and
performs one or both of an operation of correcting the data signal and an operation of outputting a control signal representing a control setting for the modulation operation to the control unit using a monitoring result, and the control unit controls the modulation operation of the optical modulator using the control signal if receiving the control signal.

7. The optical communication system according to claim 6, wherein:
the control unit receives operation information indicating a condition of the modulation operation from the optical modulator and outputs an operation signal using the operation information to the optical communication apparatus through the pluggable electric connector, and
the optical communication apparatus monitors the condition of the modulation operation using the operation signal.

8. The optical communication system according to claim 7, wherein the optical modulator is configured to output a signal generated by converting a part of the optical signal into an electric signal to the control unit as the operation information.

9. The optical communication system according to claim 6, wherein the optical modulator is configured as a Mach-Zehnder type optical modulator in which the phase modulation area is disposed on an optical waveguide.

10. The optical communication system according to claim 6, wherein if the pluggable electric connector is inserted into the optical communication apparatus, the control unit outputs the driver signal, and wherein the optical communication apparatus monitors the modulation operation of the optical modulator in response to the driver signal, and performs one or both of the operation of correcting the data signal and the operation of outputting the control signal to the control unit using the monitoring result.

* * * * *